US010821892B2

(12) United States Patent
Nagamine

(10) Patent No.: US 10,821,892 B2
(45) Date of Patent: Nov. 3, 2020

(54) NOTIFICATION DEVICE FOR MOBILE UNIT

(71) Applicant: AISIN SEIKI KABUSHIKI KAISHA, Kariya-shi, Aichi-ken (JP)

(72) Inventor: Noboru Nagamine, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 16/487,738

(22) PCT Filed: Sep. 7, 2017

(86) PCT No.: PCT/JP2017/032363
§ 371 (c)(1),
(2) Date: Aug. 21, 2019

(87) PCT Pub. No.: WO2018/154819
PCT Pub. Date: Aug. 30, 2018

(65) Prior Publication Data
US 2019/0389375 A1  Dec. 26, 2019

(30) Foreign Application Priority Data
Feb. 23, 2017 (JP) .................................. 2017-032256

(51) Int. Cl.
*B60Q 5/00* (2006.01)
*A61G 5/10* (2006.01)
*B60Q 1/54* (2006.01)

(52) U.S. Cl.
CPC .............. *B60Q 5/008* (2013.01); *A61G 5/10* (2013.01); *B60Q 1/54* (2013.01)

(58) Field of Classification Search
CPC . B60Q 5/008; B60Q 1/54; B60Q 1/50; A61G 5/10
(Continued)

(56) References Cited

U.S. PATENT DOCUMENTS 4,087,651 A * 5/1978 Taneda .................. G11B 7/0032
369/110.04
10,136,841 B2 * 11/2018 Alghazi .................. G06F 19/00
(Continued)

FOREIGN PATENT DOCUMENTS

EP 0782511 A1 * 7/1997 .......... B60Q 1/2611
JP H02-077791 3/1990
(Continued)

*Primary Examiner* — Daryl C Pope
(74) *Attorney, Agent, or Firm* — Finnegan, Henderson, Farabow, Garrett & Dunner, LLP

(57) ABSTRACT

A notification device for a mobile unit according to an embodiment includes, for example: a storage unit that stores therein first sound data; a sound output control unit that outputs a notification sound based on the first sound data, from a sound output unit provided on the mobile unit; a generation unit that generates second sound data by performing predetermined processing on a location of sound falling, while causing the first sound data to follow a cycle of the notification sound, the predetermined processing being different from processing on a location of sound rising; and a light source drive control unit that causes a light source unit provided on the mobile unit to emit light in accordance with the intensity of a sound expressed by the second sound data.

9 Claims, 9 Drawing Sheets

(58) Field of Classification Search
USPC ........ 340/425.5, 426.1, 935, 426.22, 426.23, 340/435, 436
See application file for complete search history.

(56) References Cited

U.S. PATENT DOCUMENTS

| | | | |
|---|---|---|---|
| 2005/0280519 A1* | 12/2005 | Nagata .................... | B60Q 5/00 340/435 |
| 2010/0215182 A1* | 8/2010 | Tamaru ................ | H04R 23/008 381/56 |
| 2012/0139716 A1 | 6/2012 | Nagamine et al. | |
| 2013/0257605 A1* | 10/2013 | Tsuzuki ................ | B60Q 5/008 340/425.5 |
| 2016/0050738 A1* | 2/2016 | Bulut .................... | H05B 47/12 315/158 |
| 2016/0209594 A1* | 7/2016 | Bahl ...................... | G10K 11/18 |
| 2019/0389375 A1* | 12/2019 | Nagamine ............. | B60Q 5/008 |

FOREIGN PATENT DOCUMENTS

| | | | |
|---|---|---|---|
| JP | H07-311209 | | 11/1995 |
| JP | H09-082019 | | 3/1997 |
| JP | H11-014647 | | 1/1999 |
| JP | 2002-141974 | | 5/2002 |
| JP | 2004-205669 | | 7/2004 |
| JP | 2004-282219 | | 10/2004 |
| JP | 2006123813 A | * | 5/2006 |
| JP | 2009-122013 | | 6/2009 |
| JP | 2009-286328 | | 12/2009 |

* cited by examiner

NOTIFICATION DEVICE FOR MOBILE UNIT

CROSS-REFERENCE TO RELATED APPLICATIONS

This application is a national stage application of International Application No. PCT/JP2017/032363, filed Sep. 7, 2017, which designates the United States, incorporated herein by reference, and which is based upon and claims the benefit of priority from Japanese Patent Application No. 2017-032256, filed Feb. 23, 2017, the entire contents of which are incorporated herein by reference.

TECHNICAL FIELD

Embodiments of the present invention relates to a notification device for a mobile unit.

BACKGROUND ART

Conventionally, mobile units, such as motorized wheelchairs, electric vehicles, and hybrid vehicles, have tended to be used widely. These mobile units are powered by motors that use electric power. Motors produce smaller sounds than engines and the like, so that, when the mobile units are traveling, people around the mobile units may not notice the presence thereof.

As a result, there have been developed technologies to make the surroundings aware that a mobile unit is present by the mobile unit outputting a sound. However, when a mobile unit outputs only a sound to draw attention, the sound needs to be output continuously or a relatively loud sound needs to be output so as not to be deadened by noise and other sound, for example.

Thus, it is preferable to perform control so that sound output can be kept to some extent by combining sound with other elements instead of outputting only a sound. Other elements to be used may include light. However, simply outputting sound and light at the same time and not bringing light into agreement with sound may create a situation in which the level of risk emitted by a sound cannot be recognized with light, for example, which causes confusion. When sound and light are not in agreement with each other, a case is also conceivable as another example in which, even if a person recognizes light, the person is not able to recognize that the output source of the particular light is the output source of sound.

In contrast, when a change in light is brought into agreement with the intensity of a sound, when a person visually identifies the change in light, the person is able to recognize that the output source of the particular light is the output source of the sound, for example. As another example, even in a situation in which a sound is heard only intermittently, when a person visually identifies light, the person is able to guess the intensity of the sound from a change in light, thereby being able to grasp sound output.

Some technologies have been developed to output light in agreement with sound. These technologies tend to be used as an entertainment factor for an indicator or the like of a cellular phone, for example.

CITATION LIST

Patent Literature

Patent Document 1: Japanese Patent Laid-open Publication No. 2004-205669

Patent Document 2: Japanese Patent Laid-open Publication No. 2002-141974

Patent Document 3: Japanese Patent Laid-open Publication No. 2004-282219

SUMMARY OF INVENTION

Problem to be Solved by the Invention

However, conventional technologies are utilized for entertainment and the like, and do not take into account a situation in which a mobile unit outputs light in agreement with sound. For example, when a sound is stopped, light is often stopped in sync with the sound in the conventional technologies.

In a case in which these conventional technologies are applied to a mobile unit, when a sound is stopped, light is also stopped with the sound. In this case, when a person hears a sound falling and tries to identify the output source of the sound, a situation occurs in which light is also stopped, for example. If such a situation occurs, it may be difficult to identify the output source of the sound.

In other words, it is desired to perform control so that light output is maintained to some extent while a sound is falling even in a case in which a mobile unit outputs light in accordance with the intensity of the sound. Consequently, a notification device is demanded that can notify intuitively a person on board the mobile unit or pedestrians around the mobile unit of a shift (an improving trend or a worsening trend, for example) in the level of risk to operation performed by the person on board.

Means for Solving Problem

A notification device for a mobile unit according to an embodiment includes, for example: a storage unit that stores therein first sound data; a sound output control unit that outputs a notification sound based on the first sound data, from a sound output unit provided on the mobile unit; a generation unit that generates second sound data by performing predetermined processing on a location of sound falling, while causing the first sound data to follow a cycle of the notification sound, the predetermined processing being different from processing on a location of sound rising; and a light source drive control unit that causes a light source unit provided on the mobile unit to emit light in accordance with an intensity of a sound expressed by the second sound data. With this configuration, for example, when the light source unit emits light in sync with the notification sound, making processing at the location of sound falling different from processing at the location of sound rising causes people to recognize that the light and the sound correspond to each other, and then light emission control can be accomplished that takes into account a lag from the time when people hear the sound to the time when they recognize the light. Thus, even in a case in which the sound cannot be caught, person on board or pedestrians around the mobile unit can intuitively grasp a temporal shift in the level of risk, only from the notification expression by means of light in the same manner as the notification by means of sound, thereby improving safety.

In the notification device for the mobile unit of the embodiment, for example, when generating the second sound data from the first sound data, the generation unit performs processing for repeating a sound of a predetermined period included in the notification sound, on the location of sound falling. With this configuration, for example, repeating the sound of the predetermined period included in the notification sound causes people to recognize that the light and the sound correspond to each other, and then light emission control can be accomplished that takes into account a lag from the time when people hear the sound to the time when they recognize the light. Thus, pedestrians around the mobile unit can notice that the sound that has been output has been emitted from the mobile unit.

In the notification device for the mobile unit of the embodiment, for example, the light source drive control unit changes at least one or more of chroma and brightness of light emitted from the light source unit in sync with an intensity of a sound expressed by the second sound data. With this structure, for example, by changing at least one or more of chroma and brightness, a change in the light emitted from the light source unit in accordance with the cycle of the notification sound can be noticed.

In the notification device for the mobile unit of the embodiment, for example, the generation unit further generates the second sound data on which sound rising processing control and sound falling processing control as the predetermined processing, the sound rising processing control being performed in response to time passage during a sound rising period included in the cycle, the sound falling processing control being performed in response to time passage during a sound falling period included in the cycle, the sound falling processing control bringing a smaller variation per unit of time than that during the sound rising period. With this configuration, for example, light emission control can be accomplished that takes into account a lag from the time when people hear the sound to the time when they recognize the light.

In the notification device for the mobile unit of the embodiment, for example, the generation unit generates the second sound data on which the predetermined processing is performed, based on speed information that indicates a speed at which the mobile unit moves. With this configuration, for example, light and sound can make the surroundings aware of the speed of the mobile unit, thereby improving safety.

The notification device for the mobile unit of the embodiment further includes an acquisition unit that acquires brightness information that indicates brightness around the mobile unit, and the light source drive control unit adjusts at least one or more of chroma and brightness of light emitted by the light source unit, based on the brightness information acquired by the acquisition unit. With this configuration, for example, light emission control of the light source unit can be accomplished in accordance with the surrounding brightness, which makes it easy for the surroundings to be aware of the presence of the mobile unit with the light that is output from the light source unit, thereby improving safety.

DESCRIPTION OF EMBODIMENTS

Exemplary embodiments of a notification device for a mobile unit according to the present invention will be described below. Configurations of the embodiments described below, and operations, results, and effects brought about by the configurations are only examples. The present invention can also be accomplished by configurations other than those described in the embodiments below, and at least one of various effects based on the basic configurations and derivative effects can be achieved. In the embodiments below, an example will be described in which the notification device for a mobile unit is applied to a light and sound output control device to be mounted on a mobile unit.

A light and sound output control device 1 of an embodiment is mounted on a mobile unit. The mobile unit is a vehicle that a person can board, and corresponds to a motorized wheelchair 100 in the present embodiment. The mobile unit will be described as the motorized wheelchair 100 below. In the present embodiment, the mobile unit is not limited to a vehicle that a person can board, and may be a mobile unit available for transportation of a load, for example.

Figure 1:
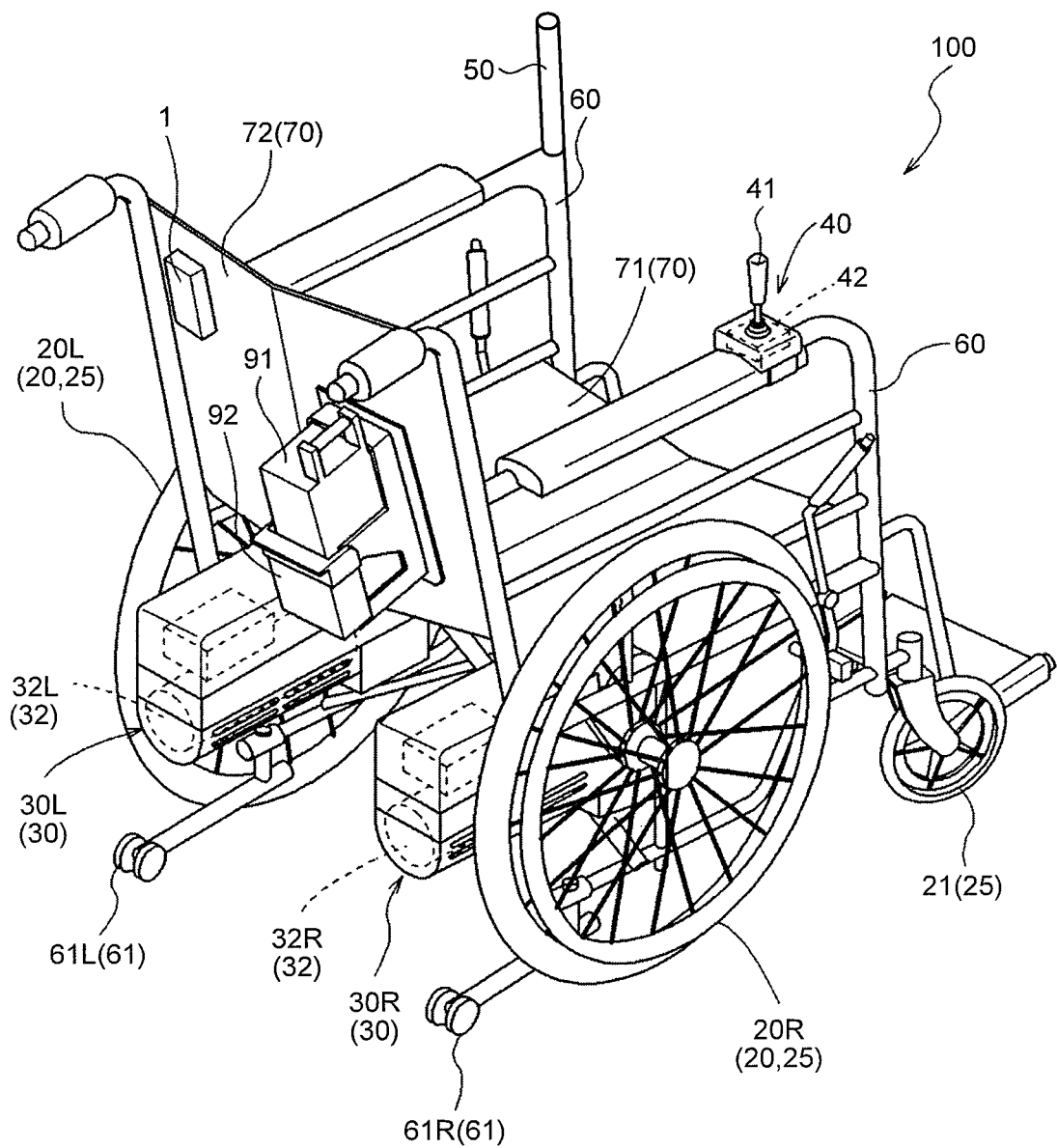
FIG. 1 is a perspective view of a mobile unit on which a light and sound output control device is mounted according to an embodiment.

FIG. 1 is a perspective view of the mobile unit on which a light and sound output control device is mounted according to the embodiment. As illustrated in FIG. 1, the motorized wheelchair 100 includes a seat 70, driving wheels 20, drive parts 30, an operation box 40, and a light source unit 50.

The seat 70 is provided by being pulled to a vehicle width direction. This seat 70 has a bottom 71 on which an occupant sits and a backrest 72 on which the occupant leans while sitting on the bottom 71. The bottom 71 and the backrest 72 are attached to frames 60 that constitute a body of the vehicle and are provided on both outer sides in the vehicle width direction. The motorized wheelchair 100 is collapsible along the vehicle width direction so as to facilitate storing and carrying the motorized wheelchair 100. The seat 70 is made of folding cloth or a sheet of vinyl.

Four wheels 25 are provided to the motorized wheelchair 100. The four wheels 25 are made up of two casters 21 and two driving wheels 20. The casters 21 are provided on the front side in a traveling direction of the motorized wheelchair 100. The traveling direction is a direction in which the motorized wheelchair 100 moves forward. The casters 21 are a pair of left and right casters arranged so as to face each other along the vehicle width direction. In FIG. 1, the caster 21 on the left side is not illustrated.

The driving wheels 20 are provided on the rear side in the traveling direction of the motorized wheelchair 100. The driving wheels 20 are made up of a left driving wheel 20L and a right driving wheel 20R arranged so as to face each other along the outer sides of the seat 70 in the vehicle width direction. The left driving wheel 20L and the right driving wheel 20R will be described as the "driving wheels 20" below unless they need to be distinguished from each other. The driving wheels 20 are wheels to which power to drive the motorized wheelchair 100 is transmitted. Meanwhile, power is not transmitted to the casters 21, which are provided to support the front part of the motorized wheelchair 100 in the present embodiment. The motorized wheelchair 100 also has fall prevention bars 61L, 61R provided that extends toward the rear of the corresponding driving wheels 20 in order to prevent the seat 70 from falling over to the rear side in the traveling direction thereof. The fall prevention bars 61L, 61R will be described as the "fall prevention bars 61" below unless they need to be distinguished from each other. The fall prevention bars 61 serve as a regulatory means to prevent falls toward the rear.

The drive parts 30 drive the respective driving wheels 20 by using electric power supplied from a battery 91. The battery 91 stores therein electric energy that powers the motorized wheelchair 100 in advance, and is attached via a holder 92 provided on the back of the backrest 72. The driving wheels 20 are a left driving wheel 20L and a right driving wheel 20R. Thus, the drive parts 30 are provided as a pair so that the left driving wheel 20L and the right driving wheel 20R can be driven independently. Being driven independently means that the left driving wheel 20L and the right driving wheel 20R can be driven at a rotational speed different from each other and in a rotational direction different from each other. As a result, the drive parts 30 are made up of a left drive part 30L and a right drive part 30R as a pair. The left drive part 30L and the right drive part 30R will be described as the "drive parts 30" below unless they need to be distinguished from each other.

The left drive part 30L has a motor 32L that outputs a torque to cause the left driving wheel 20L to rotate. The right drive part 30R has a motor 32R that outputs a torque to cause the right driving wheel 20R to rotate. The motor 32L and the motor 32R will be described as the "motors 32" below unless they need to be distinguished from each other. The electric energy that is output from the battery 91 described above is transmitted to both the left drive part 30L and the right drive part 30R, and drives the left driving wheel 20L and the right driving wheel 20R independently of each other.

The operation box 40 includes a joystick 41 and a controller 42. The joystick 41 is provided to stand vertically upward in its neutral state. By the occupant of the motorized wheelchair 100 tilting the joystick 41 from the state in a predetermined direction, the motorized wheelchair 100 can be navigated in the tilted direction. The moving speed is also set in accordance with an angle at which the joystick 41 is tilted from the vertically upward position. The joystick 41, therefore, functions as an input device with which an intention of the occupant is input. The controller 42 provides the drive parts 30 described above an instruction about the input to the joystick 41. The controller 42, therefore, functions as a speed instruction unit that provides the drive parts 30 an instruction about the set moving speed. The left drive part 30L and the right drive part 30R that constitute the drive parts 30 respectively drive the motor 32L and the motor 32R on the basis of a drive command concerning traveling control that has been input via the joystick 41.

The light source unit 50 is a light source that emits light by using the electric power supplied from the battery 91, and is fulfilled by arranging a plurality of LEDs in the interior of the light source unit 50, for example. The light source unit 50 can also change at least one or more of chroma and brightness in accordance with control from the light and sound output control device 1.

Figure 2:
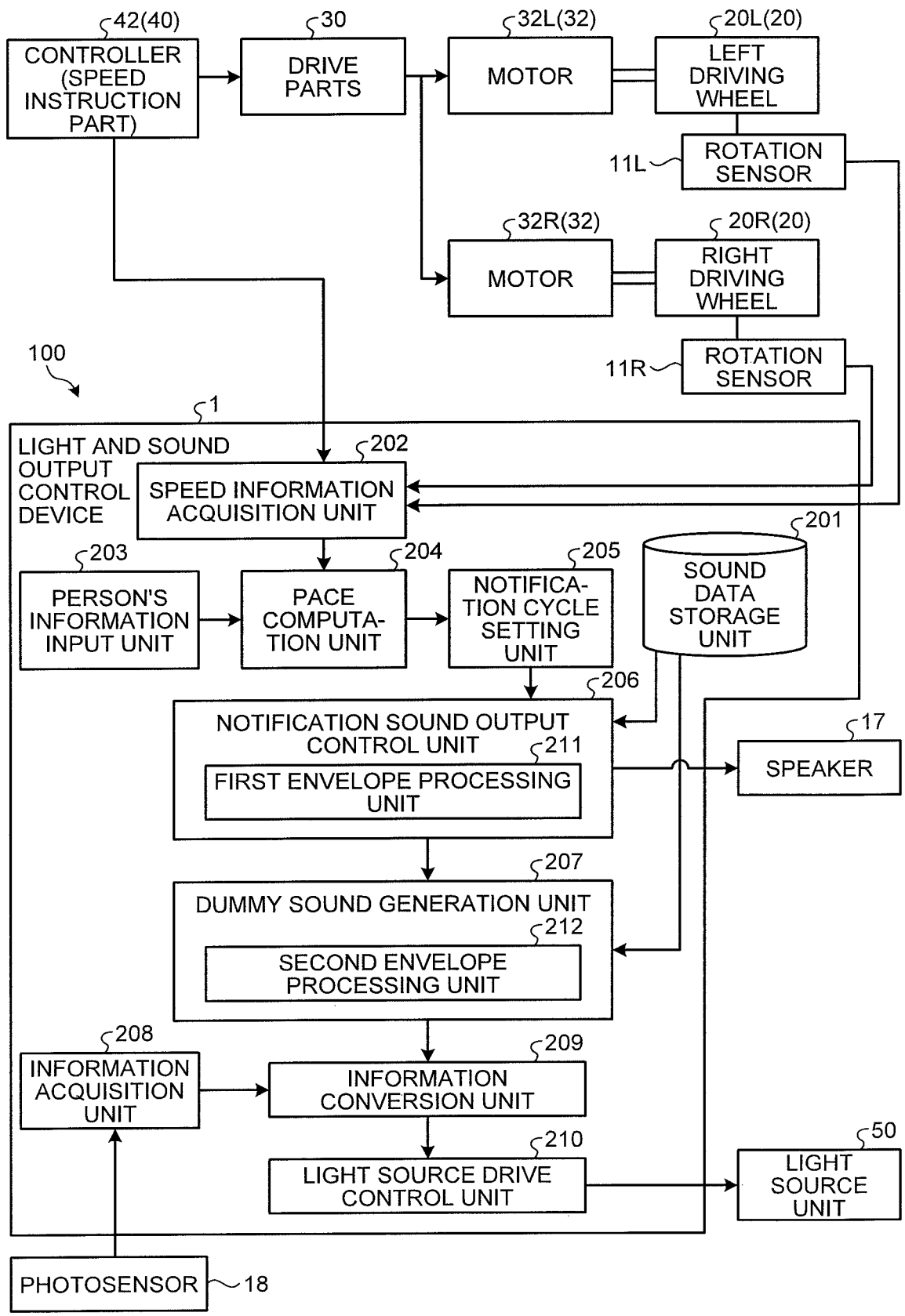
FIG. 2 is a block diagram schematically illustrating a configuration of the light and sound output control device in the embodiment.

The light and sound output control device 1 is described next. FIG. 2 is a block diagram schematically illustrating a configuration of the light and sound output control device 1 in the embodiment. The light and sound output control device 1 includes a sound data storage unit 201 on a storage (an SSD, for example) not illustrated. Furthermore, a CPU not illustrated executes a computer program stored in the storage, whereby the light and sound output control device 1 includes, on a RAM not illustrated, a speed information acquisition unit 202, a person's information input unit 203, a pace computation unit 204, a notification cycle setting unit 205, a notification sound output control unit 206, a dummy sound generation unit 207, an information acquisition unit 208, an information conversion unit 209, and a light source drive control unit 210. FIG. 2 also illustrates the driving wheels 20, the drive parts 30, the motors 32, and the controller 42 described above.

The sound data storage unit 201 stores therein sound data. The sound data of the present embodiment is waveform data describing sound in a predetermined waveform. In the present embodiment, the shape of the waveform is not particularly limited, and any shape may be possible. The sound data stored in the sound data storage unit 201 is stored as sound data in which the time that a sound is output is longer than the time that the sound is actually output. With this configuration, even in a case in which dummy sound data is processed into an envelope waveform, the sound data can be prevented from being lost.

The speed information acquisition unit 202 acquires speed information that indicates the moving speed of the motorized wheelchair 100. The moving speed is detected based on the number of revolutions of the driving wheels 20. As described above, the motorized wheelchair 100 includes the left driving wheel 20L and the right driving wheel 20R, which are driven independently of each other. Because the left driving wheel 20L and the right driving wheel 20R do not always rotate in the same manner, a rotation sensor 11L that detects the number of revolutions of the left driving wheel 20L and a rotation sensor 11R that detects the number of revolutions of the right driving wheel 20R are included in the present embodiment.

The speed information acquisition unit 202 acquires, from the rotation sensor 11L and the rotation sensor 11R, a detection result on the number of revolutions of the left driving wheel 20L and the right driving wheel 20R, and detects (computes) the moving speed of the motorized wheelchair 100 by using the acquired number of revolutions. The speed information acquisition unit 202 outputs the detected moving speed as the speed information to the pace computation unit 204.

A method of acquiring the speed information is not limited to the method of acquiring the speed information from the rotation sensors 11L, 11R. For example, because the controller 42 functions as the speed instruction unit that provides the drive parts 30 an instruction about the moving speed in response to operations of the joystick 41, the speed information acquisition unit 202 may acquire instruction details on the moving speed provided by the controller 42 and output, to the pace computation unit 204, the moving speed included in the instruction details as the speed information.

The person's information input unit 203 receives input of information on a person who is on board the motorized wheelchair 100. For example, the person's information input unit 203 receives input of the height of the person who is on board. The person's information input unit 203 may receive input of the age and sex as needed.

The pace computation unit 204 computes a pace at which the person moves with a cyclic motion, from the moving speed indicated by the speed information that has been input from the speed information acquisition unit 202. The pace at which the person moves with a cyclic motion is a pace of a person when the person is assumed to have moved at the moving speed acquired by the speed information acquisition unit 202. The pace refers to a rate at which a person moves, and is made up of the number of steps per unit of time in the present embodiment. The pace means not only a rate at which a person walks, but also includes a rate at which the person runs in the present embodiment.

The walking speed of a person is determined by the product of a stride and a pace. The stride is generally said to be a value obtained by subtracting 100 cm from the person's height. The pace is the number of steps per unit of time (1 second, for example), as described above. Thus, the pace computation unit 204 calculates the pace by dividing the moving speed indicated by the speed information that has been input from the speed information acquisition unit 202 by the stride in accordance with the height of the person who is on board the motorized wheelchair 100 (the input of which has been received by the person's information input unit 203). When the pace is calculated, the age and sex may also be taken into account, in addition to the height. Although the example has been described in which a pace is used as information indicating the moving speed in the present embodiment, the information is not limited to the pace and any cyclic motion that a person makes while walking (a wave of the hand, a shake of the face, and a swing of the hips, for example) may be possible.

The notification cycle setting unit 205 sets a notification cycle by which the presence of the motorized wheelchair 100 is notified the surroundings on the basis of the pace computed by the pace computation unit 204. The notification cycle setting unit 205 sets the reciprocal of the pace computed by the pace computation unit 204 for the notification cycle.

In the present embodiment, a sound and light in accordance with the notification cycle are combined and output in order to notify the surroundings of the presence of the motorized wheelchair 100.

The notification cycle is a cycle by which the light and sound output control device 1 notifies the surroundings of the presence of the motorized wheelchair 100. A notification period during which notification is provided and a quiescent period during which notification is stopped are specified within one cycle of the notification cycle in the present embodiment. The notification cycle that has been set by the notification cycle setting unit 205 is output to the notification sound output control unit 206.

The notification sound output control unit 206 includes a first envelope processing unit 211. After the sound data is read from the sound data storage unit 201, the notification sound output control unit 206 generates, from the sound data, notification sound data in accordance with the notification cycle that has been set by the notification cycle setting unit 205. The notification sound output control unit 206 then outputs the generated notification sound data from a speaker 17 provided to the motorized wheelchair 100. The notification sound data is generated by the first envelope processing unit 211.

The first envelope processing unit 211 performs first processing on the sound data read from the sound data storage unit 201 by using an envelope generator, and generates notification sound data indicated by a first envelope waveform. The first processing of the present embodiment is processing for cutting out the sound data in an envelope pattern indicating the first envelope waveform.

Figure 3:
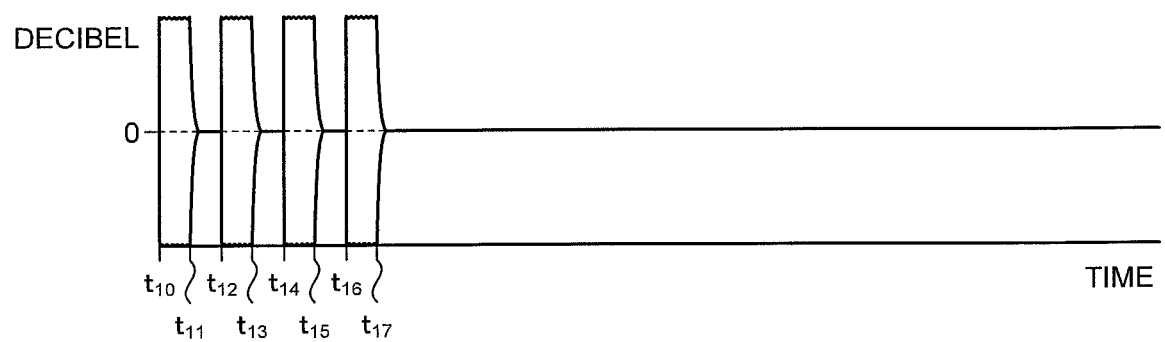
FIG. 3 is a view illustrating the shape of an envelope of a first envelope waveform used in a first envelope processing unit in the embodiment.

FIG. 3 is a view illustrating the shape of an envelope of the first envelope waveform used in the first envelope processing unit 211 in the embodiment. The envelope of the first envelope waveform illustrated in FIG. 3 is formed in accordance with the notification cycle. In other words, the envelope of the first envelope waveform of the present embodiment includes a notification period (time t10 to time t11, for example) and a quiescent period (time t11 to time t12, for example) for every cycle of the notification cycle (time t10 to time t12, for example).

The first envelope processing unit 211 generates the notification sound data in accordance with the envelope of the envelope waveform illustrated in FIG. 3, so that, after output of a notification sound from the speaker 17 is repeated four times (the first time: time t10 to time t11; the second time: time t12 to time t13; the third time: time t14 to time t15; and the fourth time: time t16 to time t17), the light and sound output control device 1 performs control so as to stop the output of the notification sound.

The notification sound output control unit 206 then outputs, from the speaker 17, the notification sound data generated by the first envelope processing unit 211. The output of the notification sound data by the notification sound output control unit 206 is timed to drive control of the light source unit 50 by the light source drive control unit 210 described later.

In the present embodiment, the envelope waveform of the notification sound is not limited to the shape illustrated in FIG. 3, and other shapes may be possible. For example, an envelope waveform that brings "a sense of alarm" may be used depending on the status of the mobile unit, or an envelope waveform that brings "a sense of luxury" and "a comfortable feeling" may be used considering a user who is on board the mobile unit.

By the way, because the notification sound is susceptible to the noise status of the surroundings, the person on board or pedestrians around the mobile unit cannot always catch the notification sound that is output from the motorized wheelchair 100. Turning up the volume of the notification sound or increasing the frequency of outputting the notification sound can improve the ease of catching the sound, which also incurs the risk of bothering the person on board or the pedestrians around the mobile unit. Consequently, it has been decided in the present embodiment to perform drive control to change at least one or more of brightness and chroma of the light source unit 50 in accordance with the intensity of the notification sound when the notification sound is output. with this configuration, when visually identifying a change in the light that has been output from the light source unit 50, the pedestrians around the motorized wheelchair 100 are able to grasp the sound that is in sync with the change in the light and that is output from the speaker 17.

The dummy sound generation unit 207 includes a second envelope processing unit 212. After the sound data is read from the sound data storage unit 201, the dummy sound generation unit 207 performs second processing on the sound data in accordance with the notification cycle that has been set by the notification cycle setting unit 205, and generates dummy sound data.

The dummy sound data is not sound data that is output from the speaker 17, but is sound data used to control the change in the light that is output from the light source unit 50. In other words, it has been decided in the present embodiment not to use the notification sound data that is output from the notification sound output control unit 206, but to use the dummy sound data that is generated by the dummy sound generation unit 207 when performing drive control of the light that is output from the light source unit 50. The dummy sound data, which is sound data in accordance with the notification cycle, is also in sync with the notification sound data.

The second envelope processing unit 212 generates dummy sound data indicated by a second envelope waveform by using an envelope generator that performs second processing.

The second envelope processing unit 212 of the present embodiment cuts out the sound data in an envelope pattern indicating the second envelope waveform by using the envelope generator that performs second processing. In the envelope pattern indicating the second envelope waveform, a location of sound falling and a location of sound rising have waveforms different from each other, that is to say, different processing is performed. More specifically, the envelope pattern indicating the second envelope waveform is a pattern that includes such changes that the sound becomes louder as time passes during a sound rising period, whereas the sound becomes softer as time passes during a sound falling period. Additionally, the envelope pattern is a pattern in which the absolute value of a derivative value of a variation during the sound rising period is larger than the absolute value of a derivative value of a variation during the sound falling period.

The envelope pattern indicating the second envelope waveform uses such a pattern that the intensity of a sound changes as time passes, which makes the waveform smoother than the envelope pattern (indicating the first envelope waveform) of the notification sound. As a result, performing drive control of the light source unit 50 on the basis of the dummy sound data enables improved visual recognizability and can also produce the effect of reducing flashing of the light to prevent glare.

Figure 4:
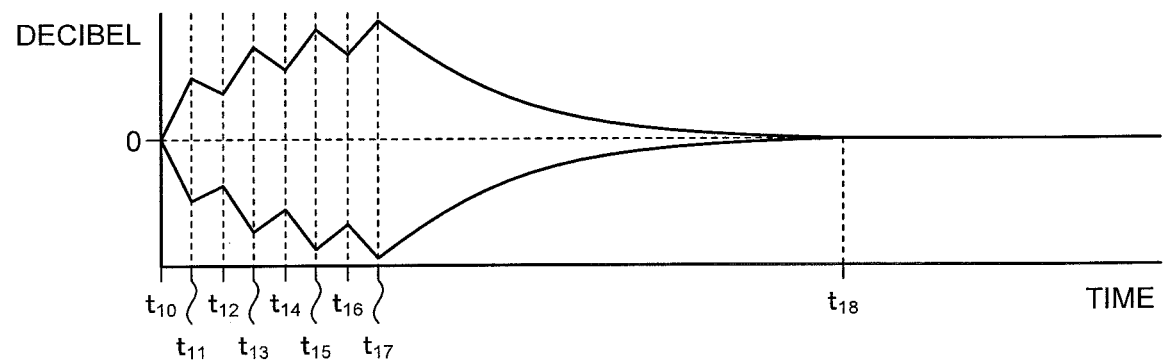
FIG. 4 is a view illustrating the shape of an envelope of a second envelope waveform used in a second envelope processing unit in the embodiment.

FIG. 4 is a view illustrating the shape of an envelope of the second envelope waveform used in the second envelope processing unit 212 in the embodiment. The envelope of the second envelope waveform illustrated in FIG. 4 is formed in accordance with the notification cycle in the same manner as the first envelope waveform. In other words, the envelope of the second envelope waveform of the present embodiment includes a sound rising period (time t10 to time t11, for example) and a sound falling period (time t11 to time t12, for example) for every cycle of the notification cycle (time t10 to time t12, for example). Additionally, the normal sound rising period (time t10 to time t11, for example) corresponds to a notification period, and the sound falling period (time t11 to time t12, for example) corresponds to a quiescent period.

The second envelope waveform has such an envelope that a period is formed during which the sound rises abruptly so as to correspond to the notification period of the notification sound data and that a period is also formed during which the sound falls gently so as to correspond to the quiescent period.

The second envelope processing unit 212 uses the second envelope waveform described above, thereby generating the dummy sound data on which sound rising processing control has been performed in response to time passage during the sound rising period (time t10 to time t11, for example) included in the notification cycle, and sound falling processing control has also been performed in response to time passage, with a smaller variation per unit of time than that during the sound rising period, during the sound falling period (time t11 to time t12, for example) included in the notification cycle and the sound falling period (time t17 to time t18, for example) after notification is finished.

Thus, the second envelope waveform has such an envelope that a change is made more gently at the location of sound falling than the location of sound rising. Furthermore, the second envelope waveform has such an envelope that the sound falls still more gently at the location of sound falling after notification using the notification sound data is finished (time t17, for example) than that during the normal sound rising period. With this configuration, the dummy sound data has the sound continuously falling over an extended time period from time t17 to time t18, as the example illustrated in FIG. 4 in the present embodiment.

The second envelope processing unit 212 generates the notification sound data in accordance with the envelope of the envelope waveform illustrated in FIG. 4, so that, after processing to change at least one or more of brightness and chroma of the light from the light source unit 50 is repeated four times (the first time: time t10 to time t11; the second time: time t12 to time t13; the third time: time t14 to time t15; and the fourth time: time t16 to time t17), the light and sound output control device 1 performs control so as to decrease at least one or more of brightness and chroma of the light during a predetermined period (time t17 to time t18, for example).

In the present embodiment, the notification sound and the light of the light source unit 50 are in agreement with each other in that they are output in accordance with the notification cycle. However, the notification sound and the light of the light source unit 50 are different from each other in that the sound is clearly switched between on and off, whereas the light is gradually changed instead of being clearly switched between on and off.

In other words, control to increase at least one or more of brightness and chroma of the light is performed during the sound rising period of the dummy sound data, and control to decrease at least one or more of brightness and chroma of the light is performed during the sound falling period of the dummy sound data in the present embodiment.

In doing so, by using the dummy sound data described above, the control to decrease at least one or more of brightness and chroma of the light changes more gently than the control to increase at least one or more of brightness and chroma of the light does.

As a result, a long time is required from the time at which the notification sound is turned off (time t17, for example) to the time at which the light completely goes out (time t18, for example). In the present embodiment, by performing this control, even after the motorized wheelchair 100 has stopped output of the notification sound, people around the motorized wheelchair 100 can see the light going out, so that they can guess that the motorized wheelchair 100 was outputting the notification sound.

Conventionally, there have been developed technologies to display the sound level in real time by means of light by an indicator or the like of a cellular phone, for example. Given that the indicator displays the sound level in real time by means of light, if light output is maintained after a sound is stopped, sound and light are not in agreement with each other, thereby providing a feeling that something is wrong. In other words, conventional technologies do not take into account controlling light output with transient response characteristics (a time constant) that deviate greatly from loudness characteristics of a person.

In contrast, even after the notification sound continues to fall and is stopped, the light output from the light source unit 50 is maintained in the light and sound output control device 1 of the present embodiment. In the present embodiment, light is used not to display the sound level in real time, but to enable people to recognize the presence of the output source of the notification sound (the mobile unit, for example). For this reason, it is decided that, even after the sound continues to fall and is stopped, the light output from the light source unit 50 is maintained.

The information acquisition unit 208 acquires, from a photosensor 18, brightness data that indicates the brightness around the motorized wheelchair 100.

The information conversion unit 209 converts the dummy sound data generated by the dummy sound generation unit 207 into light control data to be output from the light source unit 50.

The information conversion unit 209 of the present embodiment converts the intensity of the sound of the dummy sound data into a combination of brightness and chroma of light. The information conversion unit 209 of the present embodiment performs a conversion on the basis of the brightness data acquired by the information acquisition unit 208.

Figure 5:
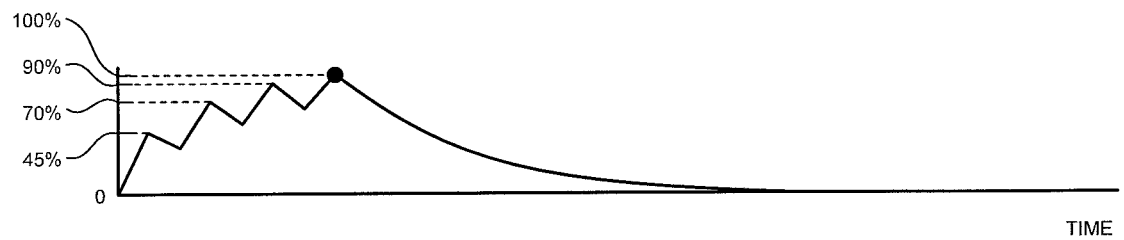
FIG. 5 is a view illustrating change information obtained by extracting changes on the positive side of dummy sound data in FIG. 4.

FIG. 5 is a view illustrating change information obtained by extracting changes on the positive side of the dummy sound data in FIG. 4. In the example illustrated in FIG. 5, the information conversion unit 209 extracts changes on the positive side of the dummy sound data, and uses the changes on the positive side as change information for adjustment of the brightness and chroma of the light from the light source. In the change information of the present embodiment, the minimum value of the dummy sound data is set at 0%, and the maximum value of the dummy sound data is set at 100%.

Furthermore, the information conversion unit 209 sets a range of the combination of brightness and chroma that can be adjusted by the light source unit 50, on the basis of the brightness data acquired by the information acquisition unit 208.

The information conversion unit 209 of the present embodiment sets a lower limit of the brightness that can be adjusted by the light source unit 50, on the basis of the brightness data acquired by the information acquisition unit 208. In the present embodiment, a minimal brightness with which people around the motorized wheelchair 100 can visually identify the light of the light source unit 50 with the surrounding brightness based on the brightness data is set as the lower limit of the brightness of the light source unit 50. Specific brightness is to be set according to the implementation.

Figure 6:
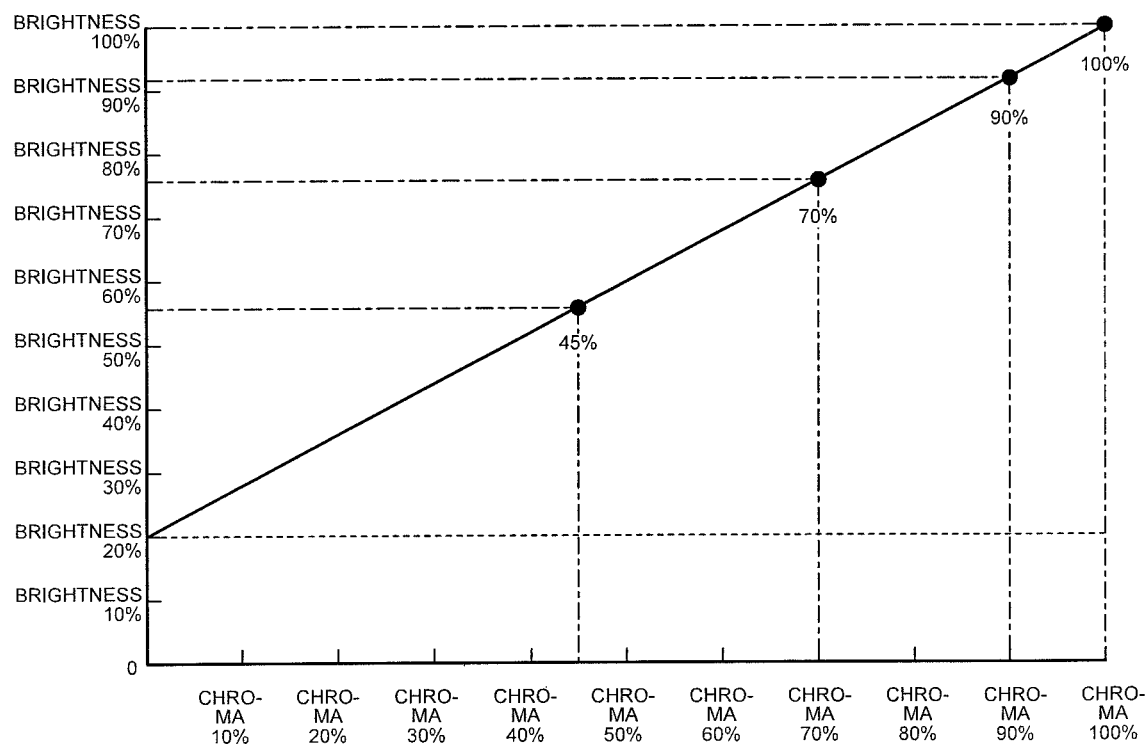
FIG. 6 is a view illustrating combinations of brightness and chroma that an information conversion unit calculates from values of the change information on the basis of a predetermined linear relation, in the embodiment.

FIG. 6 is a view illustrating combinations of brightness and chroma that the information conversion unit 209 calculates from values of the change information on the basis of a predetermined linear relation. FIG. 6 illustrates an example in which the lower limit of the brightness is set at 20% on the basis of the brightness data acquired by the information acquisition unit 208. The information conversion unit 209 calculates a combination of brightness and chroma that corresponds to the intensity of the sound of the dummy sound data by substituting a value (from 0% to 100%) of the change information into a function that expresses a linear relation from 20% in brightness and 0% in chroma to 100% in brightness and 100% in chroma.

The example in FIG. 6 illustrates combinations of brightness and chroma that correspond to the values (45%, 70%, 90%, 100%) of the change information in FIG. 5. The information conversion unit 209 of the present embodiment can derive a combination of brightness and chroma that corresponds to the notification sound data by performing the processing described above.

The present embodiment is not limited to using the function based on the linear relation when a combination of brightness and chroma is calculated, as long as there is a correlation between values of the change information and combinations of brightness and chroma.

Figure 7:
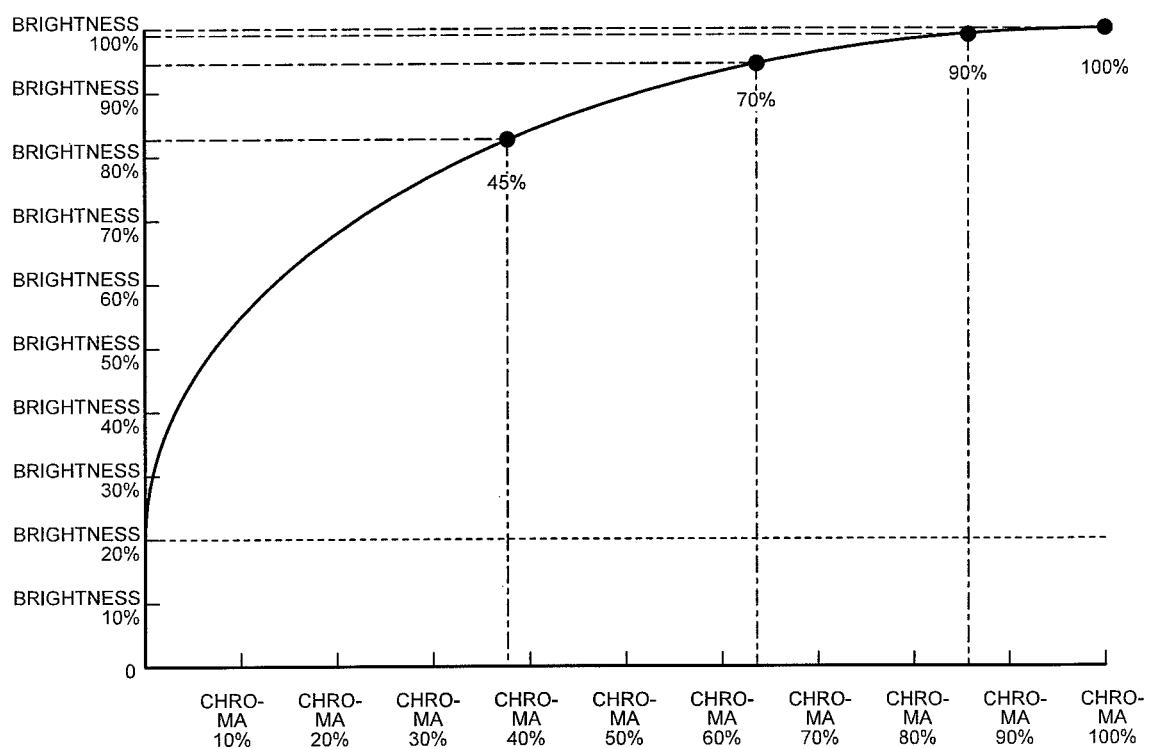
FIG. 7 is a view illustrating combinations of brightness and chroma that an information conversion unit calculates from values of the change information on the basis of a predetermined correlation, according to modifications of the embodiment.

FIG. 7 is a view illustrating combinations of brightness and chroma that the information conversion unit 209 calculates from values of the change information on the basis of a predetermined correlation, according to modifications of the embodiment. In the example illustrated in FIG. 7, a length with 0% in chroma and 20% in brightness as the starting point on a line expressed by a logarithmic function is correlated with a value of the change information, whereby a combination of brightness and chroma is calculated from the value of the change information.

Figure 8:
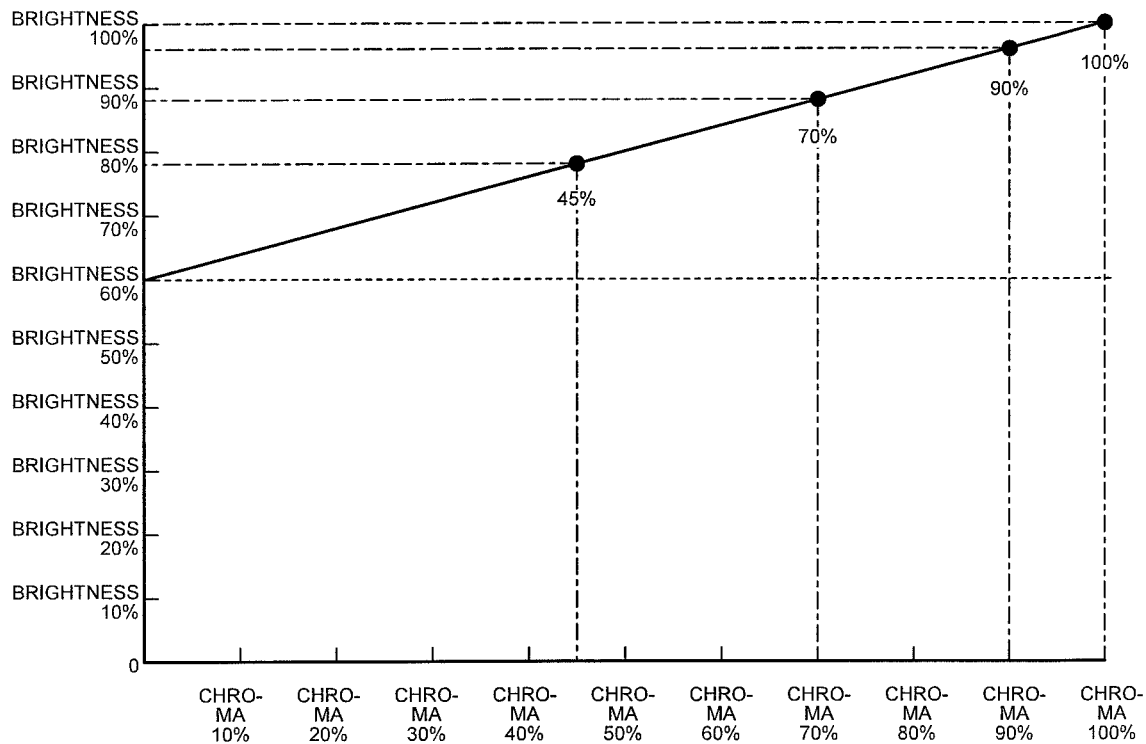
FIG. 8 is a view illustrating combinations of brightness and chroma that an information conversion unit calculates from values of the change information on the basis of a predetermined linear relation, in the embodiment.

The description now returns to the embodiment, and a case will be described in which the surrounding brightness differs from that in FIG. 6. FIG. 8 is a view illustrating combinations of brightness and chroma that the information conversion unit 209 calculates from values of the change information on the basis of a predetermined linear relation, in the embodiment. FIG. 8 illustrates an example in which the surroundings of the motorized wheelchair 100 is brighter than the situation illustrated in FIG. 6, so that the lower limit of the brightness is set at 60% on the basis of the brightness data acquired by the information acquisition unit 208. The information conversion unit 209 calculates a combination of brightness and chroma that corresponds to the intensity of the sound of the dummy sound data by substituting a value (from 0% to 100%) of the change information into a function that expresses a linear relation from 60% in brightness and 0% in chroma to 100% in brightness and 100% in chroma.

The light source drive control unit 210 performs light emission control of the light source unit 50 provided to the motorized wheelchair 100, in accordance with the combination of brightness and chroma that has been calculated by the information conversion unit 209. Given that the combination of brightness and chroma calculated by the information conversion unit 209 is derived from the intensity of the sound expressed by the dummy sound data, the light source drive control unit 210 performs control so as to change at least one or more of chroma and brightness of the light emitted from the light source unit 50 in sync with the intensity of the sound expressed by the dummy sound data.

Additionally, given that the light source drive control unit 210 performs drive control of the light source unit 50 by the combination of brightness and chroma calculated on the basis of the brightness by the information conversion unit 209, the light source drive control unit 210 adjusts at least one or more of chroma and brightness of the light emitted by the light source unit 50 on the basis of the brightness data acquired by the information acquisition unit 208.

The light source drive control unit 210 of the present embodiment performs light emission control of the light source unit 50 in sync with the output of the notification sound data by the notification sound output control unit 206.

Figure 9:
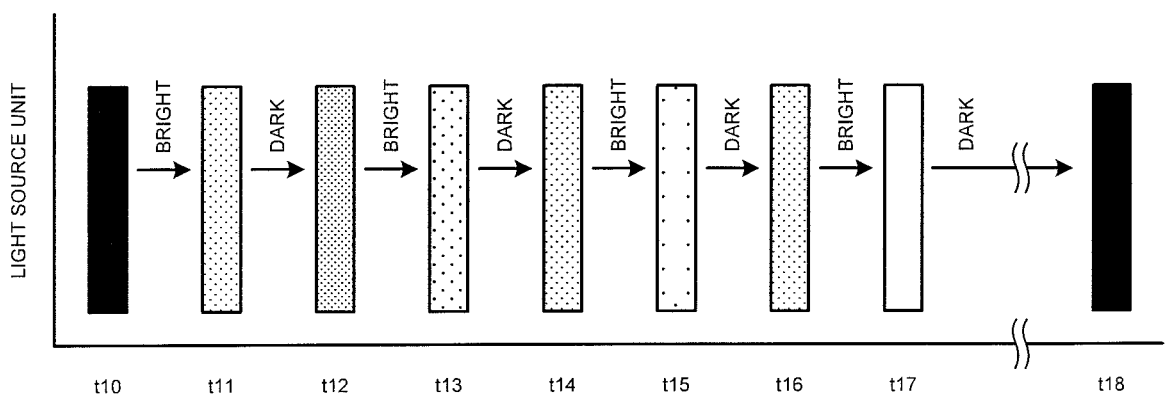
FIG. 9 is a view illustrating light emission control of a light source unit performed by a light source drive control unit in the embodiment.

FIG. 9 is a view illustrating light emission control of the light source unit 50 performed by the light source drive control unit 210 in the embodiment. In the example illustrated in FIG. 9, drive control of the light source unit 50 is performed in correspondence with the intensity of the sound of the dummy sound data illustrated in FIG. 4. For example, during the period of sound rising from time t10 to t11 illustrated in FIG. 4, drive control is performed so that the light emitted from the light source unit 50 becomes bright in FIG. 9. During the period of sound falling from time t11 to t12 illustrated in FIG. 4, drive control is performed so that the light emitted from the light source unit 50 becomes dark in FIG. 9. By performing drive control of light as illustrated in FIG. 9, such drive control can be accomplished as to maintain a state in which, after drive control of the light has been brought into sync with the notification sound, even if the notification sound is stopped, the light is not stopped with the brightness and chroma of the light decreasing.

Figure 10:
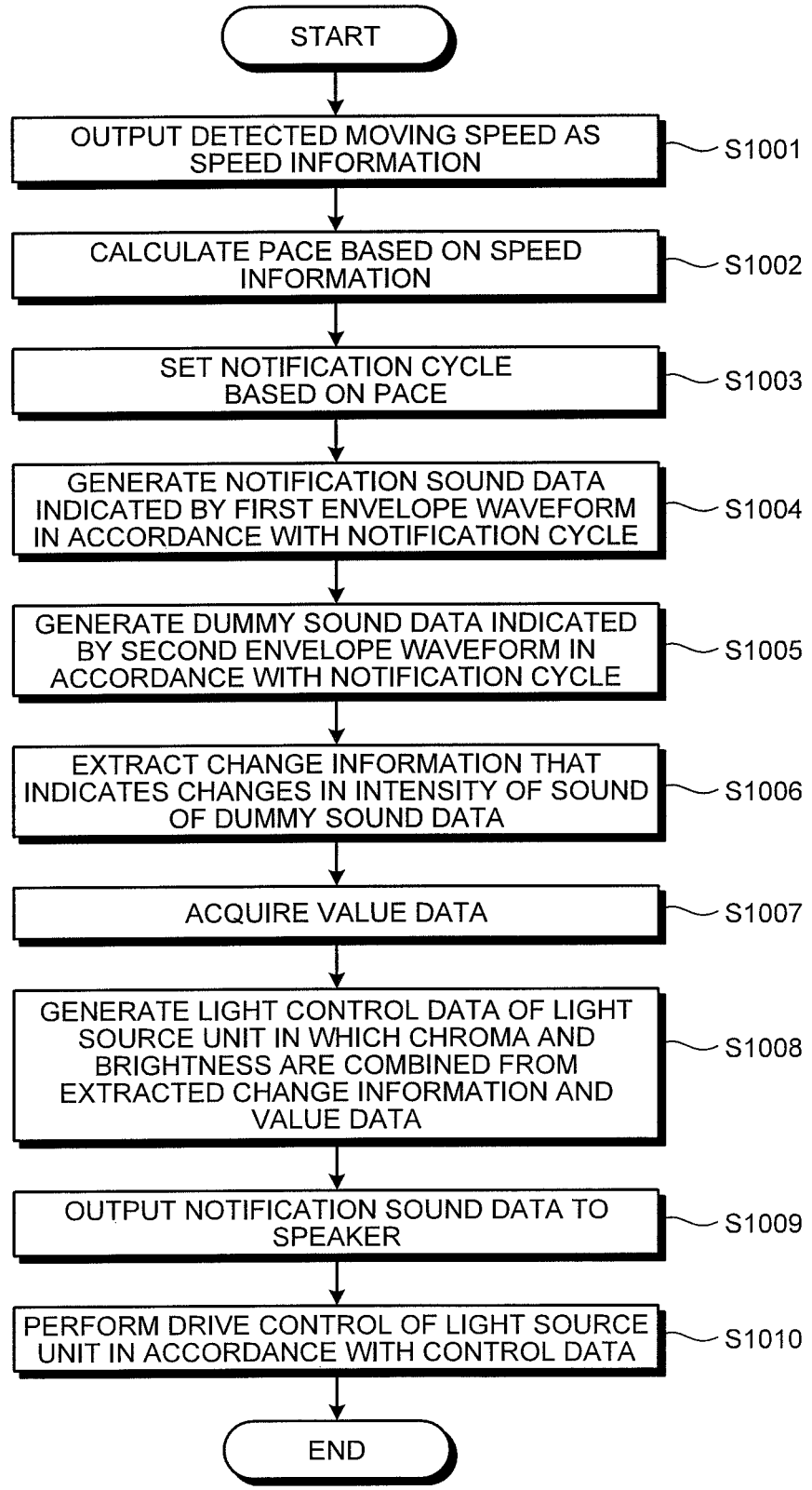
FIG. 10 is a flowchart illustrating a procedure to be followed up to drive control of a light source in the light and sound output control device in the embodiment.

A process up to drive control of the light source in the light and sound output control device 1 of the present embodiment is described next. FIG. 10 is a flowchart illustrating a procedure of the process described above in the light and sound output control device 1 in the embodiment.

The speed information acquisition unit 202 outputs the moving speed of the motorized wheelchair 100 as speed information to the pace computation unit 204 (S1001).

The pace computation unit 204 calculates a pace of a person on the basis of the speed information that has been input from the speed information acquisition unit 202 (S1002).

The notification cycle setting unit 205 sets a notification cycle by which the presence of the motorized wheelchair 100 is notified the surroundings on the basis of the pace computed by the pace computation unit 204 (S1003).

The first envelope processing unit 211 of the notification sound output control unit 206 generates notification sound data indicated by the first envelope waveform in accordance with the notification cycle, for the sound data read from the sound data storage unit 201 (S1004). The first envelope waveform is the same as the waveform described above, and the description thereof is omitted.

The second envelope processing unit 212 of the dummy sound generation unit 207 then generates dummy sound data indicated by the second envelope waveform in accordance with the notification cycle, for the sound data read from the sound data storage unit 201 (S1005). The second envelope waveform is the same as the waveform described above, and the description thereof is omitted.

The information conversion unit 209 extracts, from the dummy sound data generated by the dummy sound generation unit 207, change information that indicates changes in the intensity of the sound on the positive side of the dummy sound data (S1006).

Meanwhile, the information acquisition unit 208 acquires, from the photosensor 18, brightness data that indicates the brightness around the motorized wheelchair 100 (S1007).

The information conversion unit 209 then generates light control data of the light source unit 50 in which chroma and brightness are combined from the extracted change information and the brightness data (S1008).

The notification sound output control unit 206 then outputs the notification sound data generated at S1004 to the speaker 17 (S1009).

Meanwhile, the light source drive control unit 210 performs drive control of the light source unit 50 in accordance with the control data in which chroma and brightness are combined and that has been calculated by the information conversion unit 209 (S1010). Starting drive control of the light source unit 50 is timed to the notification sound output control unit 206 starting output of the notification sound data. With this configuration, the light and the output of the notification sound can be brought into sync with each other.

It has been decided in the present embodiment to change the combination of chroma and brightness of the light from the light source unit 50 in conjunction with the intensity of the notification sound. In the present embodiment, combinations of chroma and brightness are tied to the intensity of the notification sound, thereby enabling detailed parameter control in conjunction with sound. With this configuration, visual recognizability of continuous changes can be improved.

However, the present embodiment is not limited to an example in which combinations of chroma and brightness are used, as long as a continuous change in light is used. For example, at least one of chroma and brightness may be used, or hue or the like may be combined. Alternatively, other color spaces may be used instead of performing control by using the HSV color space consisting of chroma, brightness, and color phase. Furthermore, a gamma value or color temperature, for example, may be used as color representation.

In the present embodiment, the example has been described in which a notification cycle is set on the basis of a pace calculated from speed information that indicates the speed at which the motorized wheelchair 100 moves, and dummy sound data in which the sound falling time is adjusted is generated on the basis of the notification cycle. However, the present embodiment is not limited to a method of generating dummy sound data on the basis of a notification cycle based on a pace, and any method may be used by which dummy sound data is generated on the basis of the speed information that indicates the speed at which the motorized wheelchair 100 moves.

In the present embodiment, the example has been described in which a lower limit (offset) of brightness at which the light source unit 50 outputs is set on the basis of brightness information that indicates the surrounding brightness. However, the present embodiment is not limited to a method of setting a lower limit of brightness at which the light source unit 50 outputs on the basis of brightness information, and any method may be used by which at least one or more of chroma and brightness of the light emitted by the light source unit 50 is adjusted on the basis of the brightness information, thereby enabling the surroundings to recognize the light of the light source unit 50.

Additionally, the example has been described in which a lower limit (offset) of brightness is set on the basis of the brightness information in the present embodiment. However, the present embodiment is not limited to a method of setting a lower limit (offset) of brightness and chroma in accordance with the surrounding brightness, and the lower limit may be set in accordance with other elements. A lower limit (offset) of brightness and chroma may be set in accordance with the traveling position and speed of the motorized wheelchair 100, for example.

<First Modification>

In the embodiment described above, the case has been described in which the dummy sound data as illustrated in FIG. 4 is generated. However, the embodiment described above is not limited to generating the dummy sound data as illustrated in FIG. 4.

Figure 11:
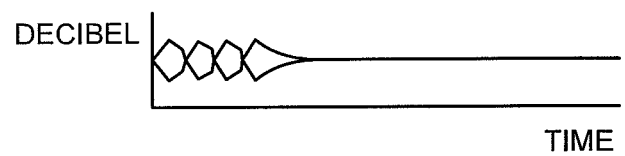
FIG. 11 is a view illustrating the shape of an envelope of a second envelope waveform used in a second envelope processing unit according to a first modification.

FIG. 11 is a view illustrating the shape of an envelope of the second envelope waveform used in the second envelope processing unit 212 according to the first modification. The envelope of the second envelope waveform illustrated in FIG. 11 is formed in accordance with the notification cycle in the same manner as that of the embodiment described above. In other words, the envelope of the second envelope waveform of the present embodiment is formed so that the intensity of the sound increases from '0' during the sound rising period (time t10 to time t11, for example), and the sound rises again from an intensity of the sound of '0' after the sound falling period (time t11 to time t12, for example) is finished, for one cycle of the notification cycle (time t10 to time t12, for example).

<Second Modification>

In the embodiment and the first modification described above, processing is performed so that the sound falling time of the dummy sound data is longer than that of the notification sound data. However, the embodiment and the first modification are not limited to the processing described above, and what is called audio effect processing may be added so that the sound falling time is further increased greatly. Thus, a case is described in which delay is used when the dummy sound data is generated in the second modification. Delay is processing in which a copy sound of the notification sound is repeated while being attenuated at regular intervals.

The second envelope processing unit 212 of the present modification performs processing for repeating the sound of a predetermined period included in the notification sound data, on the location of sound falling of the dummy sound data when the dummy sound data is generated from the sound data stored in the sound data storage unit 201. An envelope waveform for performing the processing is described next.

Figure 12:
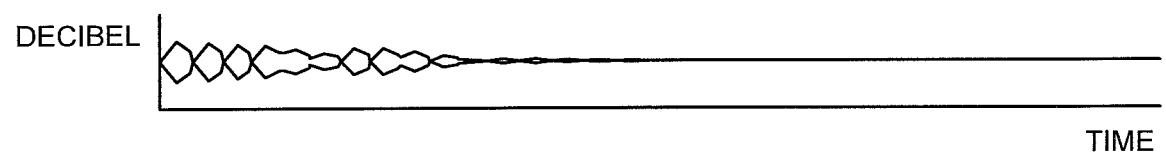
FIG. 12 is a view illustrating the shape of an envelope of a second envelope waveform used in a second envelope processing unit according to a second modification.

FIG. 12 is a view illustrating the shape of an envelope of the second envelope waveform used in the second envelope processing unit 212 according to the second modification. Delay, which is a type of audio effect processing, is performed on the envelope of the second envelope waveform illustrated in FIG. 12. By performing drive control of the light source unit 50 in accordance with the dummy sound data, light emission control of the light source unit 50 is performed by the same notification cycle as that of the notification sound even after the notification sound is stopped.

In the present modification, the cycle by which the delay changes the light of the light source unit 50 is the same as the notification cycle of the notification sound. As a result, when visually identifying the light of the light source unit 50, people around the motorized wheelchair 100 can guess that the output source of the notification sound is the motorized wheelchair 100 even after the notification sound is stopped.

<Third Modification>

In the second modification described above, the case has been described in which delay is used when the dummy sound data is generated. However, the audio effect processing is not limited to the delay. Thus, a case is described in which reverb is used when the dummy sound data is generated in the third modification. Reverb is processing in which a reverberant sound obtained by artificially reproducing the notification sound is repeated while being attenuated at regular intervals.

Figure 13:
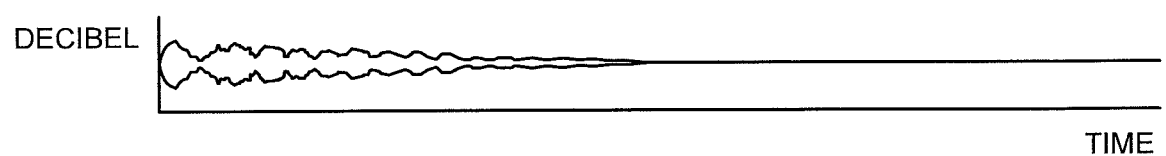
FIG. 13 is a view illustrating the shape of an envelope of a second envelope waveform used in a second envelope processing unit according to a third modification.

FIG. 13 is a view illustrating the shape of an envelope of the second envelope waveform used in the second envelope processing unit 212 according to the third modification. Reverb, which is a type of audio effect processing, is performed on the envelope of the second envelope waveform illustrated in FIG. 13. By performing drive control of the light source unit 50 in accordance with the dummy sound data, light control of the light source unit 50 is performed by the same notification cycle as that of the notification sound even after the notification sound is stopped. With this configuration, the same effect as that of the second modification can be obtained.

In the second modification and the third modification, a spatial effect (delay and reverb, for example) is used, thereby repeating the light obtained by reproducing a pattern of the intensity of the notification sound in accordance with the changed combination of brightness and chroma, which enables people around the motorized wheelchair 100 to recognize, by means of light, the output source of the sound that they have heard earlier. Because the change in the light is repeated compared with the embodiment described above, the effect can also be produced of people around the motorized wheelchair 100 easily noticing the change.

<Fourth Modification>

In the second modification and the third modification described above, the case has been described in which a spatial effect (delay and reverb, for example) is used when the dummy sound data is generated. However, the audio effect processing is not limited to the spatial effect (delay and reverb). Thus, a case is described in which a compressor, which is a dynamic range control effect, is used when the dummy sound data is generated in the fourth modification. A compressor is processing in which, after the difference between a big sound and a small sound of the notification sound is reduced, the notification sound is repeated while being attenuated at regular intervals.

Figure 14:
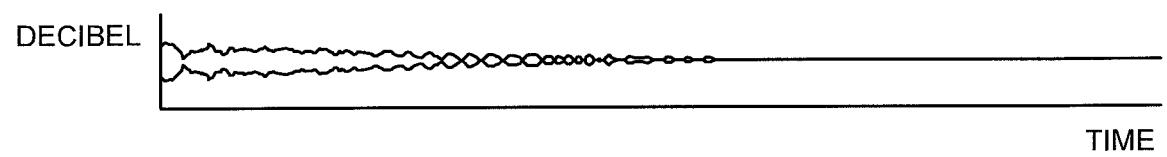
FIG. 14 is a view illustrating the shape of an envelope of a second envelope waveform used in a second envelope processing unit according to a fourth modification.

FIG. 14 is a view illustrating the shape of an envelope of the second envelope waveform used in the second envelope processing unit 212 according to the fourth modification. Compressor processing, which is a type of audio effect processing, is performed on the envelope of the second envelope waveform illustrated in FIG. 14. By performing drive control of the light source unit 50 in accordance with the dummy sound data, light control of the light source unit 50 is performed by the same notification cycle as that of the notification sound even after the notification sound is stopped.

Although the case is described in which a compressor is used as a dynamic range control effect in the fourth modification, other effects (a gate and a limiter, for example) may also be used.

In the present modification, by reducing the difference between a big sound and a small sound, the difference in dynamic ranges between sound and light can be reduced. Because the change in the light is continuously repeated compared with a case in which the change in the light is smoothly falls, the effect can be produced of people around the motorized wheelchair 100 easily noticing the change.

<Fifth Modification>

In the present embodiment and the modifications, the examples have been described in which notification sound data and dummy sound data are generated by using an envelope pattern according to the notification cycle based on the pace. However, the present embodiment and the modifications are not limited to using the notification cycle based on the pace when the notification sound data and the dummy sound data are generated. For example, the level of risk to operation performed by the person on board the motorized wheelchair 100 may be expressed by the notification sound data. Thus, an example is described in which the notification sound data is output considering the level of risk in the present modification.

In the present modification, the notification sound output control unit 206 acquires the level of risk to the operation performed by the person on board the motorized wheelchair 100. The notification sound output control unit 206 then generates the notification sound data in response to the level of risk. As a method of generating the notification sound data in response to the level of risk, any generating method may be used regardless of whether the method is a well-known technology. For example, varying the shape of the envelope waveform in response to the level of risk is conceivable.

The process subsequent to generation of the dummy sound data is the same as that of the embodiment and the description thereof is omitted.

In the present modification, a shift ("an improving trend"/ "a worsening trend") in the level of risk to the operation performed by the person on board the mobile unit can be notified intuitively the person on board or pedestrians around the mobile unit not only by the notification sound but also by means of light. Thus, the person on board or pedestrians around the mobile unit can grasp the level of risk by means of the light of the light source unit 50 even in a case in which the sound cannot be heard because of noise. With this configuration, safety can be improved.

In the embodiment and the modifications described above, it has been decided that, when the notification sound is output, the chroma and brightness of the light of the light source unit 50 are changed in conjunction with the intensity of the notification sound or on/off of the sound. Performing control so as to maintain the light of the light source unit 50 while the notification sound falls can cause people around the motorized wheelchair 100 to notice the presence of the motorized wheelchair 100.

In the embodiment and the modifications described above, the examples have been described in which an electric wheelchair is used as a mobile unit. However, the mobile unit is not limited to an electric wheelchair in the present embodiment, and other mobile units may be possible. An example of the mobile unit may include a single-passenger personal mobility vehicle. Additionally, the personal mobility vehicle is not limited to a vehicle that a person can board, and may be intended to transport a load, for example.

Furthermore, the mobile unit may be an automobile and the like. In a case in which the mobile unit is an automobile and the like, the output destination of the notification sound may be surroundings of the automobile and the like, or may be the interior of the automobile and the like. A light and sound output control device provided in the interior of the automobile and the like causes a light source unit provided in the vicinity of a speaker to glow when outputting a notification sound, thereby enabling a person on board to recognize the output source of the notification sound.

In the embodiment and the modifications described above, it has been decided that, when a change in the light that is output from the light source unit 50 is brought into sync with the notification sound, not only the notification sound data but also dummy sound data the sound falling time of which is set to be longer than that of the notification sound data are generated, and drive control of a change in the light of the light source unit 50 is performed in correspondence with the dummy sound data.

In the embodiment and the modifications described above, even if the surroundings of the motorized wheelchair 100 are an environment where the noise environment and the lighting environment vary greatly, producing intuitive output by utilizing sound and light in a complementary manner enables people around and an operator of the motorized wheelchair 100 to gain an appropriate awareness of the motorized wheelchair 100. This can lead to a margin of safety behavior.

In the embodiment and the modifications described above, even in a case in which the notification sound cannot be caught, the light of the light source unit 50 is changed in response to the notification sound, so that the same content as that of the notification by means of sound can be grasped intuitively.

In the embodiment and the modifications described above, the rhythm of the notification sound can be perceived with a pattern of the change in the light that is output form the light source unit 50. As a result, by visually identifying the pattern of the change in the light that is output form the light source unit 50, a change in the intensity of the sound can also be noticed. Consequently, the ease of catching the notification sound can be improved.

In the embodiment and the modifications described above, it has been decided that processing is performed so that the falling time of the light is longer than that of the sound while utilizing the sound and the light in a complementary manner, instead of drawing attention by using the light that is output from the light source unit 50. With this configuration, even after the sound is stopped, the light is caused to linger, so that control can be accomplished that takes into account a time lag from when people around the motorized wheelchair 100 hear the sound to when they visually identify the light.

While certain embodiments of the present invention have been described, these embodiments have been presented by way of example only, and are not intended to limit the scope of the inventions. These novel embodiments may be embodied in a variety of other forms, and various omissions, substitutions, and changes may be made without departing from the spirit of the inventions. The accompanying claims and their equivalents are intended to cover these embodiments or modifications thereof as would fall within the scope and spirit of the inventions.

The invention claimed is:

1. A notification device for a mobile unit, the notification device comprising:
   a storage unit that stores therein first sound data;
   a sound output control unit that outputs a notification sound based on the first sound data, from a sound output unit provided on the mobile unit;
   a generation unit that generates second sound data by performing predetermined processing on a location of sound falling, while causing the first sound data to follow a cycle of the notification sound, the predetermined processing being different from processing on a location of sound rising; and a light source drive control unit that causes a light source unit provided on the mobile unit to emit light in accordance with an intensity of a sound expressed by the second sound data, wherein the generation unit further generates the second sound data on which sound rising processing control and sound falling processing control as the predetermined processing, the sound rising processing control being performed in response to time passage during a sound rising period included in the cycle, the sound falling processing control being performed in response to time passage during a sound falling period included in the cycle, the sound falling processing control bringing a smaller variation per unit of time than that during the sound rising period.

2. The notification device for the mobile unit according to claim 1, wherein, when generating the second sound data from the first sound data, the generation unit performs processing for repeating a sound of a predetermined period included in the notification sound, on the location of sound falling.

3. The notification device for the mobile unit according to claim 1, wherein the light source drive control unit changes at least one or more of chroma and brightness of light emitted from the light source unit in sync with an intensity of a sound expressed by the second sound data.

4. The notification device for the mobile unit according to claim 1, wherein the generation unit generates the second sound data on which the predetermined processing is performed, based on speed information that indicates a speed at which the mobile unit moves.

5. The notification device for a mobile unit according to claim 1, further comprising an acquisition unit that acquires brightness information that indicates brightness around the mobile unit, wherein the light source drive control unit adjusts at least one or more of chroma and brightness of light emitted by the light source unit, based on the brightness information acquired by the acquisition unit.

6. A notification device for a mobile unit, the notification device comprising:

a storage unit that stores therein first sound data;

a sound output control unit that outputs a notification sound based on the first sound data, from a sound output unit provided on the mobile unit;

a generation unit that generates second sound data by performing predetermined processing on a location of sound falling, while causing the first sound data to follow a cycle of the notification sound, the predetermined processing being different from processing on a location of sound rising;

a light source drive control unit that causes a light source unit provided on the mobile unit to emit light in accordance with an intensity of a sound expressed by the second sound data; and an acquisition unit that acquires brightness information that indicates brightness around the mobile unit, wherein the light source drive control unit adjusts at least one or more of chroma and brightness of light emitted by the light source unit, based on the brightness information acquired by the acquisition unit.

7. The notification device for the mobile unit according to claim 6, wherein, when generating the second sound data from the first sound data, the generation unit performs processing for repeating a sound of a predetermined period included in the notification sound, on the location of sound falling.

8. The notification device for the mobile unit according to claim 6, wherein the light source drive control unit changes at least one or more of chroma and brightness of light emitted from the light source unit in sync with an intensity of a sound expressed by the second sound data.

9. The notification device for the mobile unit according to claim 6, wherein the generation unit generates the second sound data on which the predetermined processing is performed, based on speed information that indicates a speed at which the mobile unit moves.

\* \* \* \* \*